United States Patent
Li

(10) Patent No.: US 10,866,649 B2
(45) Date of Patent: Dec. 15, 2020

(54) GESTURE IDENTIFICATION METHOD AND ELECTRONIC DEVICE

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/340,497

(22) PCT Filed: Sep. 25, 2018

(86) PCT No.: PCT/CN2018/107214
§ 371 (c)(1),
(2) Date: Apr. 9, 2019

(87) PCT Pub. No.: WO2019/062682
PCT Pub. Date: Apr. 4, 2019

(65) Prior Publication Data
US 2019/0243462 A1 Aug. 8, 2019

(30) Foreign Application Priority Data
Sep. 26, 2017 (CN) .......................... 2017 1 0882327

(51) Int. Cl.
G06F 3/01 (2006.01)
G06F 3/03 (2006.01)
G06K 9/00 (2006.01)

(52) U.S. Cl.
CPC .............. G06F 3/017 (2013.01); G06F 3/01 (2013.01); G06F 3/0304 (2013.01); G06K 9/00 (2013.01)

(58) Field of Classification Search
CPC .......... G06F 3/017; G06F 3/01; G06F 3/0304; G06K 9/00
See application file for complete search history.

(56) References Cited

U.S. PATENT DOCUMENTS 8,881,051 B2 * 11/2014 Frey ........................ G06F 3/013
715/800
9,189,068 B2 * 11/2015 Im ........................... G06F 3/005
(Continued)

FOREIGN PATENT DOCUMENTS

| CN | 202075718 U | 12/2011 |
| CN | 102508547 A | 6/2012 |

(Continued)

OTHER PUBLICATIONS

International Search Report and Written Opinion for Application No. PCT/CN2018/107214, dated Dec. 27, 2018, 9 Pages.

(Continued)

*Primary Examiner* — Sejoon Ahn
(74) *Attorney, Agent, or Firm* — Brooks Kushman P.C.

(57) ABSTRACT

A gesture identification method and an electronic device are provided. The gesture identification method includes: processing each 2D image of a plurality of 2D images including a pointing object, to acquire an imaging size of the pointing object in each 2D image; determining at least one target 2D image from the plurality of 2D images based on the imaging size of the pointing object in each 2D image; and determining and executing a corresponding instruction based on the at least one target 2D image.

14 Claims, 9 Drawing Sheets

(56) References Cited

U.S. PATENT DOCUMENTS

| | | | |
|---|---|---|---|
| 9,323,352 B1* | 4/2016 | Haskin | G06F 3/017 |
| 9,848,780 B1* | 12/2017 | DeBusschere | A61B 5/0261 |
| 2002/0006222 A1* | 1/2002 | Inagaki | G06F 3/017 |
| | | | 382/181 |
| 2004/0028260 A1* | 2/2004 | Higaki | G06F 3/017 |
| | | | 382/118 |
| 2006/0285770 A1* | 12/2006 | Lim | G06K 9/6206 |
| | | | 382/276 |
| 2007/0117625 A1* | 5/2007 | Marks | G06F 3/0346 |
| | | | 463/30 |
| 2008/0273755 A1* | 11/2008 | Hildreth | G06F 1/1626 |
| | | | 382/103 |
| 2009/0167882 A1* | 7/2009 | Chen | G06K 9/00335 |
| | | | 348/222.1 |
| 2011/0243380 A1* | 10/2011 | Forutanpour | G06F 3/017 |
| | | | 382/103 |
| 2011/0306422 A1* | 12/2011 | Nishimoto | G06F 3/017 |
| | | | 463/36 |
| 2012/0270653 A1* | 10/2012 | Kareemi | A63F 13/52 |
| | | | 463/33 |
| 2013/0083173 A1* | 4/2013 | Geisner | G06F 3/1423 |
| | | | 348/51 |
| 2013/0181897 A1* | 7/2013 | Izumi | G06F 3/011 |
| | | | 345/156 |
| 2013/0278493 A1* | 10/2013 | Wei | G06K 9/00355 |
| | | | 345/156 |
| 2014/0153774 A1* | 6/2014 | Obata | G06K 9/00355 |
| | | | 382/103 |
| 2014/0198031 A1* | 7/2014 | Xiong | G06F 3/017 |
| | | | 345/156 |
| 2014/0267009 A1* | 9/2014 | DeLean | G06F 3/017 |
| | | | 345/156 |
| 2014/0282274 A1* | 9/2014 | Everitt | G06F 3/017 |
| | | | 715/863 |
| 2015/0084859 A1* | 3/2015 | Itzhaik | G06K 9/00355 |
| | | | 345/156 |
| 2015/0104075 A1* | 4/2015 | MacDougall | G06K 9/00355 |
| | | | 382/106 |

FOREIGN PATENT DOCUMENTS

| | | |
|---|---|---|
| CN | 103135756 A | 6/2013 |
| CN | 103376890 A | 10/2013 |
| CN | 103440033 A | 12/2013 |
| CN | 103440035 A | 12/2013 |
| WO | 2015057410 A1 | 4/2015 |

OTHER PUBLICATIONS

First Office Action for Chinese Application No. 201710882327.X, dated Nov. 29, 2019, 8 Pages.

Second Office Action for Chinese Application No. 201710882327.X, dated May 19, 2020, 7 Pages.

* cited by examiner

GESTURE IDENTIFICATION METHOD AND ELECTRONIC DEVICE

CROSS-REFERENCE TO RELATED APPLICATIONS

This application is the U.S. national phase of PCT Application No. PCT/CN2018/107214 filed on Sep. 25, 2018, which claims priority to Chinese Patent Application No. 201710882327.X filed on Sep. 26, 2017, which are incorporated herein by reference in their entireties.

TECHNICAL FIELD

The present disclosure relates to the field of communication technology, in particular to a gesture identification method and an electronic device.

BACKGROUND

Along with the rapid development of the electronic device technology, an electronic device itself has had an increasing operational capability as well as more and more functions. The electronic device is capable of interacting with a user in various ways, e.g., through a remoter, a mouse, voice or a gesture. The interaction through the gesture is simpler, and it is able for the user to interact with the electronic device in a natural and convenient manner, so the interaction between the user and the electronic device through the gesture has currently been applied in many scenarios.

In the related art, most of the time a target is tracked and the gesture is identified through a depth camera. However, currently the depth camera with high accuracy is very expensive, e.g., the price of Mesa Imaging SwissRanger 4000 (SR4000) is as high as 10 thousands US dollars.

In order to reduce the cost, in many scenarios a common two-dimensional (2D) image collection unit is adopted to identify the gesture, but the resultant identification accuracy is relatively low.

SUMMARY

In one aspect, the present disclosure provides in some embodiments a gesture identification method, including: processing a two-dimensional (2D) image of a plurality of 2D images comprising a pointing object, and acquiring an imaging size of the pointing object in the 2D image; determining at least one target 2D image from the plurality of 2D images based on the imaging size of the pointing object in the 2D image; and determining and executing a corresponding instruction based on the at least one target 2D image.

In another aspect, the present disclosure provides in some embodiments an electronic device, including: a first acquisition module configured to process a two-dimensional (2D) image of a plurality of 2D images comprising a pointing object, and acquire an imaging size of the pointing object in the 2D image; a first determination module configured to determine at least one target 2D image from the plurality of 2D images based on the imaging size of the pointing object in the 2D image; and an execution module configured to determine and execute a corresponding instruction based on the at least one target 2D image.

In yet another aspect, the present disclosure provides in some embodiments an electronic device, including a memory, a processor and a computer program stored in the memory and executed by the processor. The processor is configured to execute the computer program so as to implement the above-mentioned gesture identification method.

In still yet another aspect, the present disclosure provides in some embodiments a computer-readable storage medium storing therein a computer program. The computer program is executed by a processor, so as to implement the above-mentioned gesture identification method.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In order to facilitate the understanding of the scheme in the embodiments of the present disclosure, relevant principles will be described hereinafter.

At first, an imaging size of a pointing object in an image is closely related to a distance between the pointing object and an image collection unit. Detailed description will be given in the following in conjunction with FIGS. 1 to 4.

Figure 1:
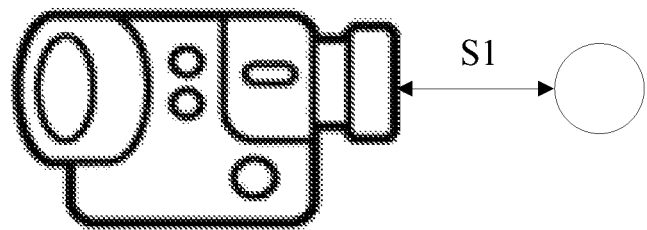
FIG. 1 is a schematic view showing an image collection distance according to one embodiment of the present disclosure.
Figure 2:
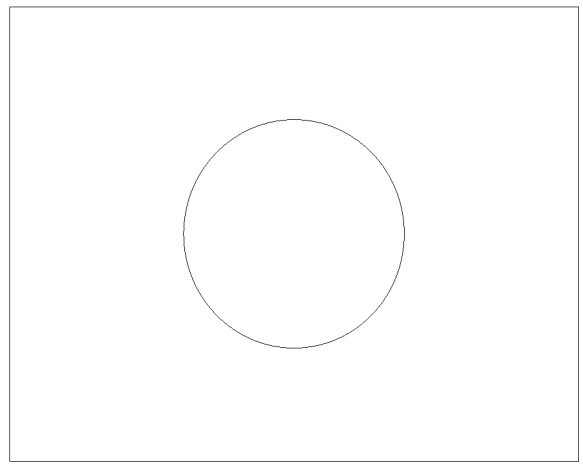
FIG. 2 is a schematic view showing a situation where an image is displayed according to one embodiment of the present disclosure.
Figure 3:
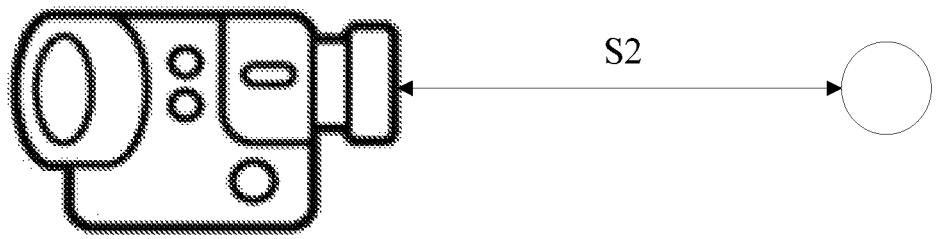
FIG. 3 is another schematic view showing the image collection distance according to one embodiment of the present disclosure.
Figure 4:
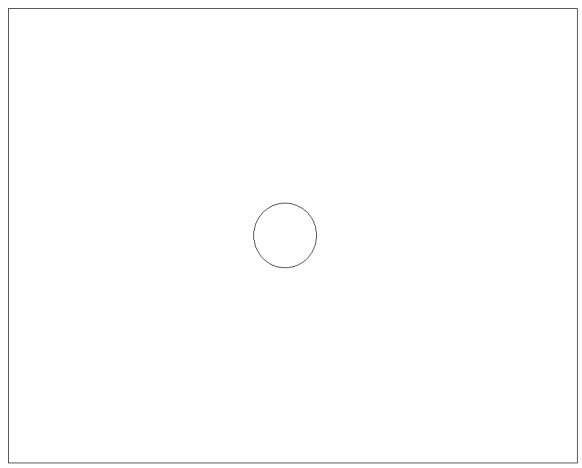
FIG. 4 is another schematic view showing the situation where the image is displayed according to one embodiment of the present disclosure.

An imaging size refers to a size of an object in an image. For example, the imaging size of the pointing object in the image refers to a size of the pointing object in the image. In FIGS. 1 to 4, the pointing object is a spherical object. As shown in FIG. 1, there is a relatively short distance between the image collection unit and the spherical object, and at this time, the imaging size of the spherical object in the image collected by the image collection unit is shown in FIG. 2. As shown in FIG. 2, there is a relatively large imaging size of the spherical object in the image collected by the image collection unit. As compared with FIG. 1, there is a relatively long distance between the image collection unit and the spherical object in FIG. 3, and at this time, the imaging size of the spherical object in the image collected by the image collection unit is shown in FIG. 4. Through the comparison of FIG. 4 with FIG. 2, it is found that, the imaging size of the spherical object in the image collected by the image collection unit in FIG. 4 is relatively small. In other words, the imaging size may be adopted to indirectly describe the distance between the pointing object and the imaging collection unit.

In the embodiments of the present disclosure, in order to improve the identification accuracy, from the perspective of a user, an operating region may be provided for the user, and merely an operation made in the operating region may be identified. Based on the above description, the imaging size may be adopted to indirectly describe the distance between the pointing object and the image collection unit, so it is able to exclude operations made beyond the operating region based on the imaging size of the pointing object, and merely identify the operation made by the user in the operating region, thereby to improve the identification accuracy.

Figure 5:
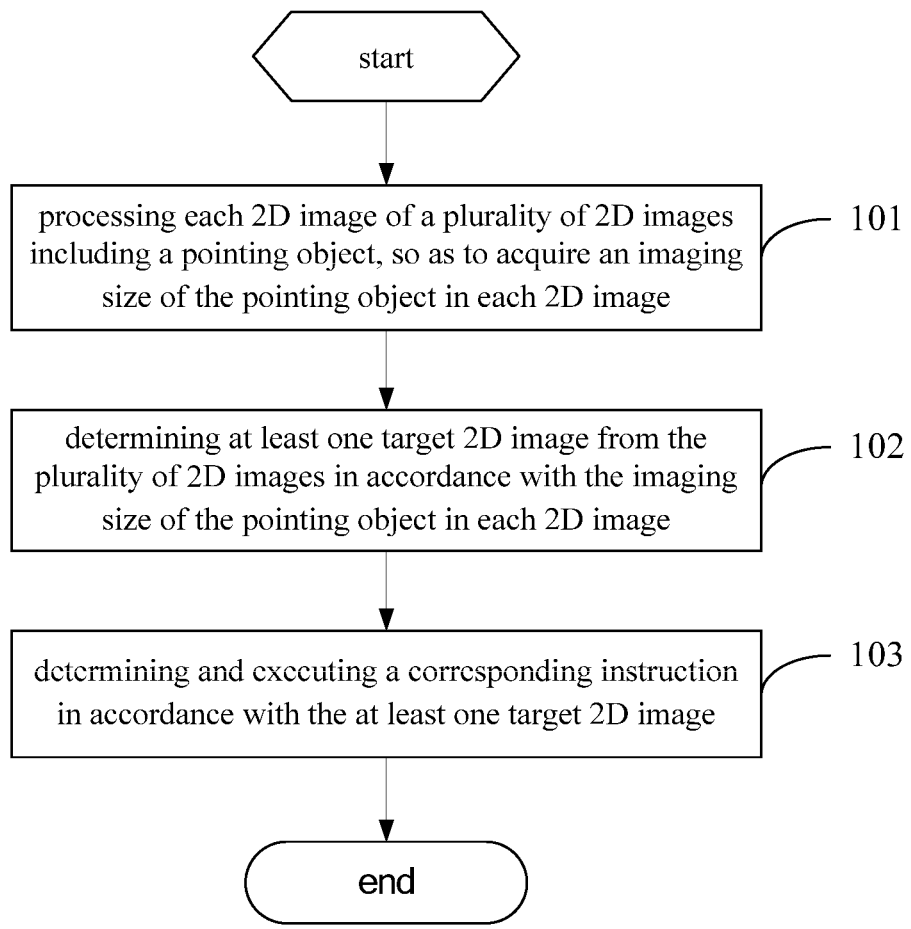
FIG. 5 is a flow chart of a gesture identification method according to one embodiment of the present disclosure.

As shown in FIG. 5, the present disclosure provides in some embodiments a gesture identification method, which includes the following Steps 101 to 103.

Step 101: processing a 2D image of a plurality of 2D images including a pointing object, and acquiring an image size of the pointing object in the 2D image.

In the embodiments of the present disclosure, the pointing object may be a finger or a palm of a user, or an object capable of being held by the user (e.g., a bar-like object), or an object attached onto the user's finger (e.g., a reflective film, or a reflective sheet of a specific shape).

Step 102: determining at least one target 2D image from the plurality of 2D images based on the image size of the pointing object in the 2D image.

Based on the principles mentioned hereinabove, in the embodiments of the present disclosure, from the perspective of the user, an operating region may be provided for the user, so operations made by the user may include two parts, e.g., operations made in the operating region and operations made beyond the operating region. The target 2D image may refer to a 2D image in which the imaging size of the pointing object is within a predetermined size range. In the embodiments of the present disclosure, merely the operations made by the user in the operating region may be identified, and an electronic device may not respond to the operations made beyond the operating region. Still based on the principles mentioned hereinabove, whether the operation is made by the user in the operating region may be determined based on the imaging size of the pointing object in each 2D image. When the imaging size of the pointing object in the 2D image is within the predetermined size range, it is able to determine that the operation is made by the user in the operating region.

Step 103: determining and executing a corresponding instruction based on the at least one target 2D image.

In the embodiments of the present disclosure, subsequent to the acquisition of the target 2D images, a control operation on the device may be performed based on an image sequence formed by the target 2D images. For example, a trajectory of the pointing object may be determined based on a plurality of target 2D images, and then the instruction matching the trajectory may be determined.

The imaging size may be adopted to indirectly describe the distance between the pointing object and an image collection unit, i.e., when the distance between the pointing object and the image collection unit changes, the imaging size of the pointing object in an image collected by the image collection unit may change too. Hence, in the embodiments of the present disclosure, it is able to identify movement of the pointing object in a direction toward the image collection unit based on the imaging size of the pointing object in the 2D images collected by a common 2D image collection unit.

In addition, it is also able to determine whether the user's operation is performed within a set space based on the imaging size of the pointing object in the 2D image collected by the common 2D image collection unit. In other words, it is able to exclude the operations which are made beyond the operation region and which may lead to erroneous identification, thereby to improve the accuracy of the gesture identification on the basis of the 2D image collection unit.

The present disclosure will be illustratively described hereinafter by taking the input of a letter "T" via WordPad. In the embodiments of the present disclosure, due to the operating region, it is merely able to identify the operation made in the operating region, thereby to improve the identification accuracy.

In the related art, when the letter "T" is to be input by the user via the WordPad, it is necessary to draw a horizontal line segment firstly, and then draw a vertical line segment from a middle point of the horizontal line segment, so as to form the letter "T". However, when the user's finger moves from an end point of the horizontal line segment to the middle point of the horizontal line segment, this action which should not be identified may also be identified, thereby resulting in the erroneous identification.

In the embodiments of the present disclosure, due to the operating region, the user may raise his hand so as to enable the hand to move beyond the set region, and then the finger may enter the set region at the middle point of the horizontal line segment. At this time, the action that the user's finger moves from the end point of the horizontal line segment to the middle point of the horizontal line segment is performed beyond the operating region, so it may not be identified, and thereby it is able to prevent the occurrence of erroneous identification. In this mode, it is merely necessary for the user to change a movement path of the finger without any excessive actions, so the entire procedure is simple.

In the embodiments of the present disclosure, the electronic device may be a mobile phone, a tablet personal computer, a laptop computer, a personal digital assistant (PDA), a mobile Internet device (MID) or a wearable device.

In the embodiments of the present disclosure, it is necessary to determine at least one target 2D image from the plurality of 2D images based on the imaging size of the pointing object in the 2D image. From the perspective of operations, it is necessary to select the operations in the operating region based on the imaging size of the pointing object in each 2D image. In the embodiments of the present disclosure, the target 2D image may be determined in various ways, and one of them will be described hereinafter.

Based on the above principle, it is able to determine whether the operation is made by the user in the operating region based on the imaging size of the pointing object in the 2D image. In the direction toward the image collection unit, whether the operation is made by the user in the operating region may be determined based on whether the imaging size of the pointing object in the 2D image is within a predetermined size range.

It should be noted that: the above operations Step 101-Step 103 can all be performed by the machine instead of being performing manually, thereby improving the automaticity of acquiring the extended question group and saving manual workloads.

Figure 6:
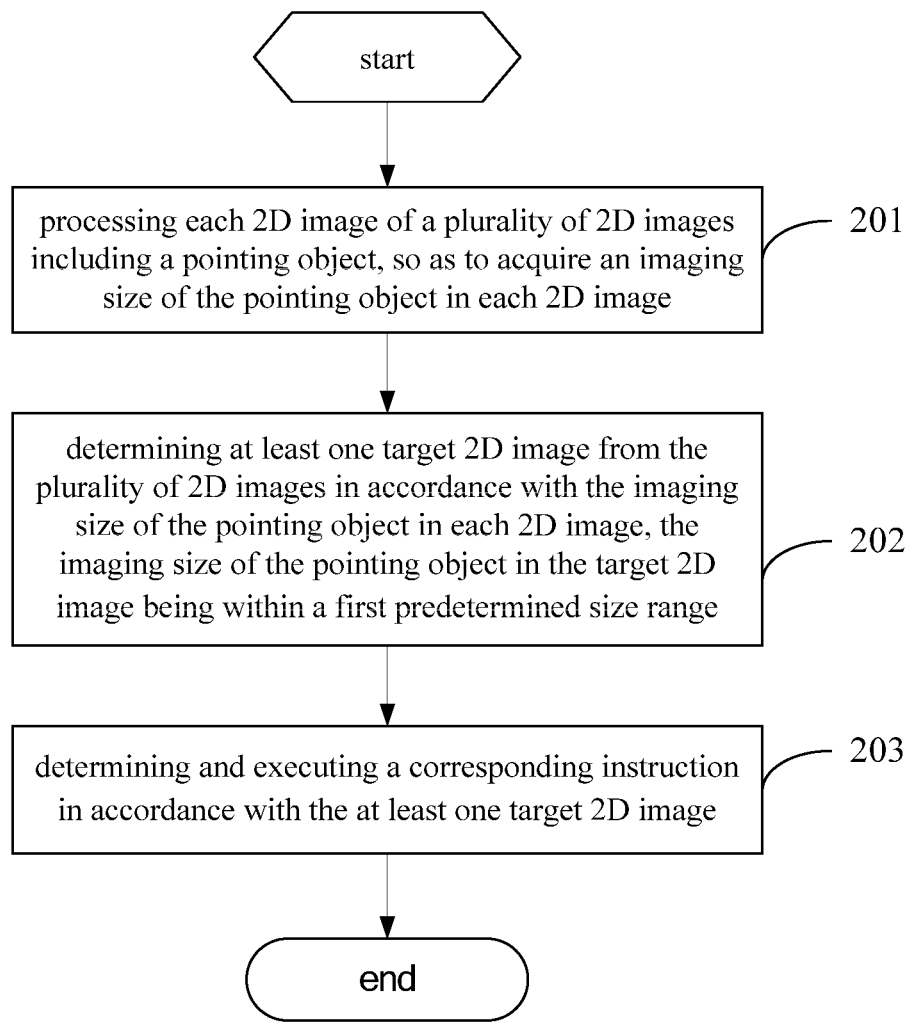
FIG. 6 is another flow chart of the gesture identification method according to one embodiment of the present disclosure.

As shown in FIG. 6, the present disclosure provides in some embodiments a gesture identification method which includes the following Steps 201 to 203.

Step 201: processing a 2D image of a plurality of 2D images including a pointing object, and acquiring an imaging size of the pointing object in the 2D image.

In the embodiments of the present disclosure, the pointing object may be a finger or a palm of a user, or a bar-like object capable of held by the user. When each 2D image including the pointing object is collected by a 2D image collection unit of an electronic device, the pointing object may move in a front-and-back or upward-and-downward manner. The pointing object may have different imaging sizes in different 2D images due to some of the movements.

Step 202: determining at least one target 2D image from the plurality of 2D images based on the imaging size of the pointing object in the 2D image. The imaging size of the pointing object in the target 2D image is within a first predetermined size range.

In the embodiments of the present disclosure, the first predetermined size range may be any appropriate range, which will not be particularly defined herein.

Based on a simple mapping relationship, the first predetermined size range has defined a depth of an operating region in a direction toward the 2D image collection unit. Due to the operating region, merely an operation made in the operating region may be identified. In other words, the user is capable of interacting with the electronic device merely in the operating region. When it is unnecessary for the user to interact with the electronic device, the user may move beyond the operating region, so it is able to perform and cancel the interaction in a more convenient manner.

Step 203: determining and executing a corresponding instruction based on the at least one target 2D image.

In the embodiments of the present disclosure, various pointing objects may be provided, e.g., the finger, the palm, the bar-like object or a spherical object. How to acquire the imaging size of the pointing object will be described hereinafter by taking the finger as an example.

When the pointing object is the finger, the processing a 2D image in the plurality of 2D images including the pointing object, and acquiring the imaging size of the pointing object in the 2D image may include: determining a connected region corresponding to the finger included in the 2D image; positioning a fingertip of the finger based on a geometrical feature of the finger and acquiring coordinates of the fingertip; and determining a width of the connected region corresponding to the fingertip based on the coordinates of the fingertip.

Figure 7:
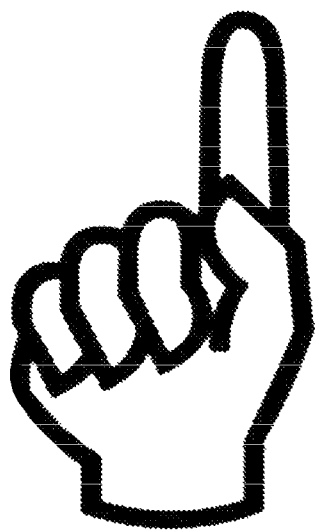
FIG. 7 is a schematic view showing a connected region according to one embodiment of the present disclosure.
Figure 8:
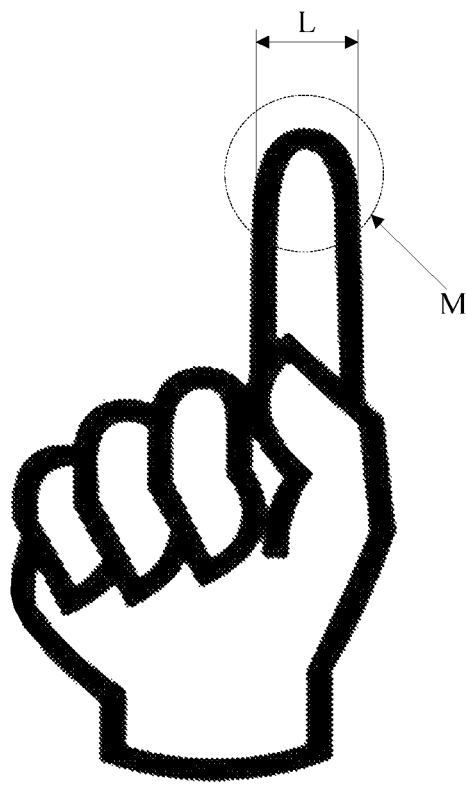
FIG. 8 is another schematic view showing the connection region according to one embodiment of the present disclosure.

The connected region corresponding to the finger may refer to a region including the finger in the 2D image for determining a position of the finger. The above procedure may be understood in a better manner with reference to FIGS. 7 and 8. At first, the connected region corresponding to the finger included in the 2D image may be identified through image identification technology. As shown in FIGS. 7 and 8, the entire palm is just the connected region corresponding to the finger. When the entire palm serves as the connected region corresponding to the finger, it is able to identify the region where the finger is located in the 2D image in a rapid and accurate manner, thereby to position in the region the fingertip of the finger and acquire the coordinates of the fingertip based on the geometrical feature of the finger in some ways. At this time, the connected region corresponding to the fingertip, e.g., a region indicated by a circle M in FIG. 8, may be determined based on the coordinates of the fingertip, and the width of the connected region may be just equal to a width L of the fingertip.

In the embodiments of the present disclosure, it is able to identify the connected region corresponding to the finger in the 2D image, e.g., the palm, through the image identification technology. Here, the connected region may be understood as a region including the entire palm, i.e., a region including the palm in a stretched or grasping manner. Identically, the fingertip of the finger may be identified through the image identification technology, and then the fingertip may be positioned so as to acquire the coordinates of the fingertip.

Upon the determination of the coordinates of the fingertip, it is able to directly record the width of the connected region corresponding to the fingertip based on the coordinates of the fingertip. In addition, the width of the connected region corresponding to the fingertip may be generally understood as a width of the fingertip in the 2D image. The width of the fingertip may be acquired as follows. At first, skin color segmentation may be performed, e.g., an Otsu's algorithm maybe adopted so as to acquire binary images. Then, some images that do not meet the requirements may be excluded based on a range of the connected region corresponding to the finger in an actually-acquired gesture operating range, i.e., settings of a maximum quantity of pixels and a minimum quantity of pixels for the width of the fingertip. Next, a gravity center may be acquired with respect to each connected region, a point furthest from the gravity center may be determined in a profile, a length and a width of the profile where the point is located may be acquired, and then a length-to-width ratio may be recorded. Finally, a maximum length-to-width ratio within an experiential ratio range may be selected from a plurality of length-to-width ratios as the fingertip, and then the width of the fingertip may be recorded for the subsequent determination of the distance change between the finger and the 2D image collection unit.

In this way, it is able for the user to interact with the electronic device directly thought the finger, without the aid of any other tools (e.g., the bar-like or spherical object). In addition, usually for most of the people, their fingers have a substantially same width, so it is able for the electronic device to set an appropriate operating region for the public.

In a possible embodiment of the present disclosure, the first predetermined size range may be one of at least two predetermined size ranges, and any two of the at least two predetermined size ranges may be in interval distribution.

In the embodiments of the present disclosure, when the first predetermined size range is one of the at least two predetermined size ranges and any two of the at least two predetermined size ranges are spaced apart from each other, there may exist at least two operating regions without overlapping each other. In other words, there may exist at least two operating regions in front of the 2D image collection unit, and the operations may be made in each operating region so as to interact with the electronic device.

Figure 9:
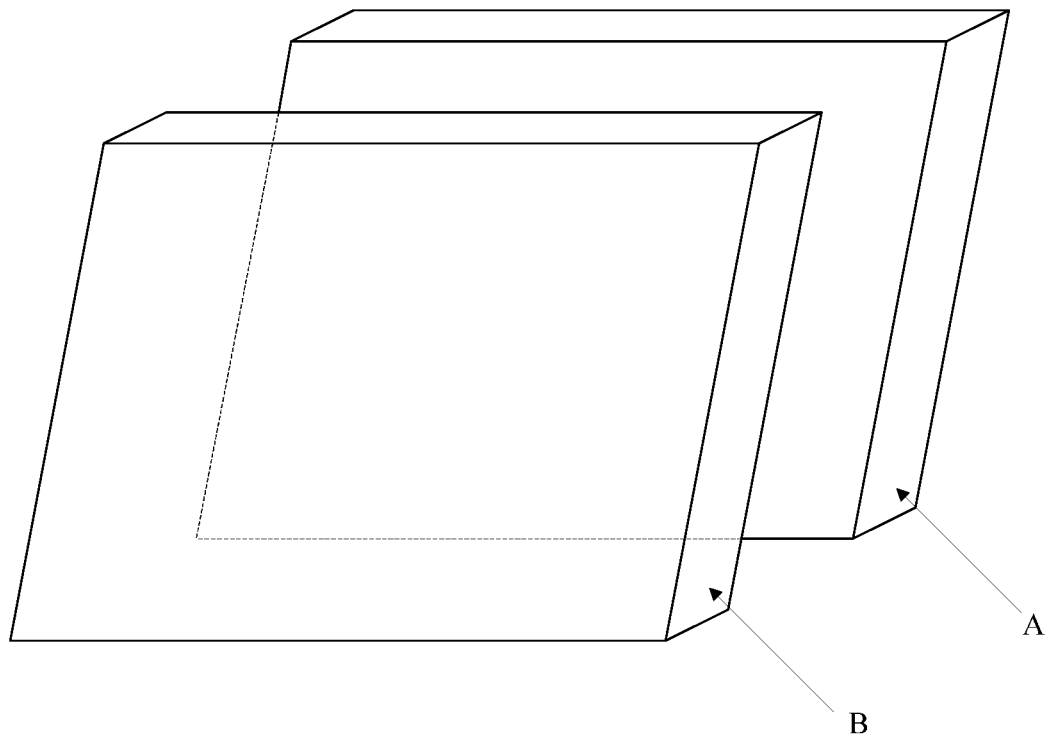
FIG. 9 is a schematic view showing different operating regions according to one embodiment of the present disclosure.

The above two operating regions may be understood in a better manner with reference to FIG. 9 which shows different operating regions. As shown in FIG. 9, there are two operating regions A and B which are spaced apart from each other by a certain space interval. The user may interact with the electronic device through the operations made in the operating region A or B, rather than in the space interval.

In the embodiments of the present disclosure, the user may select a closer one of the at least two operating regions, so as to facilitate the interaction between the user and the electronic device.

In a possible embodiment of the present disclosure, the plurality of 2D images may further include at least one 2D image corresponding to a second predetermined size range of the at least two predetermined size ranges. The determining and executing the corresponding instruction based on the at least one target 2D image may include determining and executing the corresponding instruction based on at least one target 2D image corresponding to the first predetermined size range.

In the embodiments of the present disclosure, different predetermined size ranges may correspond to different operating regions. When the corresponding instruction is determined and executed based on the at least one target 2D image corresponding to the first predetermined size range, it is able to ensure that one instruction or one operation is merely performed in one operating region, thereby to prevent the operations made in the two operating regions from forming a sequence for the subsequent action matching operation. In this way, it is able to perform the matching operation in a more accurate manner.

In addition, a size of an object in the image is related to a distance between the object and the image collection unit. When the pointing object is located at a distance closer to the image collection unit, any tiny change of the pointing object in a depth direction may lead to a relatively large change in the size of the object in the image. Hence, a larger size range may be set for the operating region closer to the image collection unit, so as to reduce the requirement on the operation accuracy.

In the embodiments of the present disclosure, for the at least two predetermined size ranges, a predetermined size range that has a larger imaging size has a larger range length.

In the embodiments of the present disclosure, when the pointing object is located closer to the image collection unit, the imaging size of the pointing object in the image collected by the image collection unit may be larger, and when the pointing object is located farther from the image collection unit, the imaging size of the pointing object in the image collected by the image collection unit may be smaller. In addition, when the pointing object is located closer to the image collection unit, any tiny movement of the pointing object in the depth direction may probably lead to a relatively large change of the imaging size of the pointing object.

In this regard, the predetermined size range having a relatively large value may correspond to the operating region having a relatively large length, so as to provide the operating region with better tolerance. When the pointing object is located closer to the image collection unit, the operation made by the user may be identified by the image collection unit in a better manner.

In a possible embodiment of the present disclosure, the gesture identification method further includes: determining a target controllable object set corresponding to the first predetermined size range based on a mapping relationship between the predetermined size ranges and controllable object sets; and displaying each controllable object in the target controllable object set.

In the embodiments of the present disclosure, the target controllable object set may include a plurality of predetermined controllable objects, e.g., icons, buttons or options for corresponding operations.

In the embodiments of the present disclosure, the first predetermined size range may correspond to one operating region. Upon the determination of the target controllable object set corresponding to the first predetermined size range, the controllable objects in the target controllable object set may be displayed. In this way, it is able to operate the controllable objects in the target controllable objet set in the operating region corresponding to the first predetermined size range. In addition, the controllable objects may be displayed in various layers, and each controllable object may be displayed in an enlarged manner, so as to reduce the requirement on the operation accuracy and the image identification accuracy, thereby to enable the user to select the desired controllable object in a convenient manner.

In the related art, usually all the controllable objects are displayed in a certain region, so an icon for each controllable object may probably be small as compared with the user's finger. At this time, when a small icon is selected through the finger, there is a relatively large probability of selecting a wrong icon, and thereby the selection accuracy may be adversely affected.

In the embodiments of the present disclosure, some of the controllable objects in the controllable object set may be displayed separately. In this way, a few of controllable objects may be displayed in a large display region, and each controllable object may be enlarged and displayed in the display region. In addition, when the coordinates of the fingertip of the user has been determined, it is able to operate a certain controllable object corresponding to the coordinates. Because the controllable objects have been enlarged, it is very easy for the user to select the desired controllable object through the finger.

In a possible embodiment of the present disclosure, the displaying each controllable object in the target controllable object set may include, when the target controllable object set is different from a currently-displayed controllable object set, updating a current first display interface into a second display interface including the controllable objects in the target controllable object set.

In the embodiments of the present disclosure, the currently-displayed controllable object set may be just the target controllable object set, and at this time it is unnecessary to display the controllable objects in the target controllable object set. When the target controllable object set is different from the currently-displayed controllable object set, the current first display interface may be updated into the second display interface including the controllable objects in the target controllable object set. In this way, it is able to switch the operating objects merely when the operating region changes, without any necessary to perform a determination operation and a refreshing operation each time.

For example, when the operation is made by the user in a first operating region, a set of buttons for an image cropping operation may be displayed in the first operating region. When the determined target controllable object set is just the set of buttons for the image cropping operation, it is unnecessary to update the display interface. When the first operating region has been switched to the second operating region and the determined target controllable object set is a set of buttons for an image rendering operation, the current display interface for the set of buttons for the image cropping operation may be updated into the display interface for the set of buttons for the image rendering operation.

In this regard, different controllable object sets may be displayed in different operating regions, so as to facilitate the operations based on the different controllable object sets. In addition, a large quantity of buttons may be displayed in different operating regions, and the user may switch the operating region by controlling an operating distance, so as to further facilitate the operation and reduce the requirement on the operation accuracy as well as the image identification accuracy.

In a possible embodiment of the present disclosure, the gesture identification method may further include: acquiring a reference 2D image; and determining the first predetermined size range based on the reference 2D image.

The above step in the embodiments of the present disclosure just relates to the initialization of the first predetermined size range. Here, it is unnecessary to set the first predetermined size range in advance, and instead, the first predetermined size range may be determined based on the acquired reference 2D image. To be specific, the imaging size of the pointing object in the reference 2D image may be incremented and decremented by a same value or different values so as to determine the first predetermined size range.

Apart from determining the first predetermined size range based on the reference 2D image, the size of the first predetermined size range may also be predefined, which will not be particularly defined herein. In the embodiments of the present disclosure, it is unnecessary to predefine the first predetermined size range, and instead, the first predetermined size range may be determined based on the reference 2D image acquired in real time. In this way, it is able to improve the adaptability between the electronic device and the user, and perform the interaction in a more flexible manner.

In a possible embodiment of the present disclosure, the first predetermined size range may be (W−dw, W+dw), W represents the imaging size of the pointing object in the reference 2D image, and dw represents a length threshold of the first predetermined size range.

In a possible embodiment of the present disclosure, the reference 2D image may include a 2D image acquired initially by the electronic device after the electronic device is started currently, or a 2D image acquired by the electronic device at a time having a time interval more than a predetermined time threshold from a time at which a previous 2D image is acquired by the electronic device.

In the embodiments of the present disclosure, when the reference 2D image is the 2D image initially acquired by the electronic device after the electronic device is started currently, it is able to initialize the electronic device in real time. Of course, during the initialization, the electronic device may send a prompt to the user, so that the user may determine whether it is necessary to initialize the electronic device. When the electronic device is not initialized, a 2D image used for the last time may serve as the reference 2D image.

In the embodiments of the present disclosure, the reference 2D image may also be the 2D image acquired by the electronic device after the predetermined time threshold from the previous 2D image acquired by the electronic device. In this way, when the user comes back after a period of absence, the user may re-initialize the electronic device. Of course, at this time, the electronic device may also send a prompt to the user, so that the user may determine whether it is necessary to initialize the electronic device. In this way, it is able to perform the interaction between the electronic device and the user in a smarter and more convenient manner.

The following description will be given so as to facilitate the understanding of the interaction. When the user begins to interact with the electronic device, the electronic device may capture the fingertip of the user through image identification, and acquire the imaging size of the fingertip.

There exist two circumstances after the acquisition of the imaging size of the fingertip. In a first circumstance, a range size has been preset in the electronic device, and at this time, an operating region may be determined based on the size range. When the imaging size of the fingertip does not meet the requirement on the operating region, it is impossible for the user to interact with the electronic device, i.e., the user may interact with the electronic device merely in the operating region determined based on the size range.

In a second circumstance, no size range is preset in the electronic device. From the perspective of the user, there is no fixed operating region. At this time, an operating region may be determined based on the imaging size of the fingertip currently collected. This procedure is equivalent to an initialization process, i.e., the initialization of the operating region.

Of course, when the operation is made by the user in a current operating region, and merely the controllable objects related to the current operating region may be displayed. In this way, it is able to enlarge some small controllable objects in the display region, thereby to facilitate the user to select the desired controllable object.

During the selection of the desired controllable object, the coordinates of the fingertip of the user may be determined at first, and then the controllable object corresponding to the coordinates of the fingertip in the display region may be selected in a rapid and accurate manner.

Of course, a plurality of size ranges may also be set in the electronic device, i.e., a plurality of operating regions may be set for the user. When the finger of the user moves in the depth direction, the imaging size of the fingertip may change correspondingly. When the imaging size of the fingertip moves from a current size range to another size range, the operation may be identified by the image collection unit and the user may interact with the electronic device again.

When the imaging size of the fingertip moves from the current size range to the other size range, it also means that one operating region has been switched to another operating region, from the perspective of the user. At this time, some controllable objects corresponding to the other operating region may be displayed by the electronic device. Also, these controllable objects may be displayed in an enlarged manner, so as to facilitate the operation.

Apart from the above, another interaction mode may also be provided in the embodiments of the present disclosure.

The image collection unit of the electronic device may acquire a position and a width of the fingertip, and the electronic device may initialize a first layer based on the position and width of the fingertip. The first layer may be a layer in a specific direction, and the specific direction may be a direction in which the fingertip faces the image collection unit. Of course, the first layer may be a region arranged further away from, or closer to, the image collection unit.

Taking a situation where the first layer is located further away from the image collection unit as an example, the initialization is performed successfully when the fingertip is detected for the first time and the position of fingertip is maintained for several seconds. When the fingertip is not detected for a predetermined time period, and is detected again, information about the first layer may be initialized again.

The fingertip may be mapped to an operating position in the electronic device based on the quantity of pixels the fingertip has moved and an acquired image resolution. In addition, when an initial width of a base layer is W, a minimum predetermined quantity of the pixels for the fingertip is X when the fingertip moves from far to near, and a pixel variation threshold dw is adopted to represent an operation of leaving a current layer, there exist the following circumstances.

A predetermined width of each layer may be calculated based on the quantity of layers for a system. For example, when there are totally three layers, a width of an $N^{th}$ (N=0, 1 or 2) layer may be $W3=W-N*(W-X)/(3-1)$. When a current width of the fingertip is $W3\pm((W-X)/(3-1)/2)$, it means that the fingertip is located in an operating range of the third layer. Of course, preset values may be provided in any other ways, so as to enable the layers to be differentiated from each other in terms of the depth.

When the fingertip has an initial width of Wn and a change of the width is smaller than dw, it may be considered that the fingertip is still located in an operating range of an $n^{th}$ layer.

When the fingertip has an initial width of Wn, a change of the width is greater than dw and the fingertip is still in the operating range of the $n^{th}$ layer, it may be considered that the fingertip is in a raised state, i.e., the fingertip may temporarily leave the $n^{th}$ layer (e.g., the above-mentioned situation where the letter "T" is inputted).

When the fingertip has an initial width of Wn and moves into an operating range of the other layer, the display interface may be switched so as to display a corresponding operating layer.

When the fingertip has left the current layer and moved into the other layer, a corresponding prompt may be given in the display interface, or a menu for the corresponding layer may be displayed. Definitions of functions and menus for different layers may be achieved via an application software, and different layers may have different functions, so as to simplify the operating range of each layer and position the controllable object in a more accurate manner. In addition, a switching operation may be performed among the layers, so as to improve the operation efficiency.

According to the gesture identification method in the embodiments of the present disclosure, each 2D image of the plurality of 2D images including the pointing object may be processed, so as to acquire the imaging size of the pointing object in each 2D image. Next, the at least one target 2D image may be determined from the plurality of 2D images based on the imaging size of the pointing object in each 2D image, and the imaging size of the pointing object in the target 2D image is in the first predetermined size range. Then, the corresponding instruction may be determined and executed based on the at least one target 2D image. As a result, it is able to select the target 2D images based on the imaging size of the pointing object, and perform the interaction using the target 2D images that meet the requirements, thereby to improve the identification accuracy.

Figure 10:
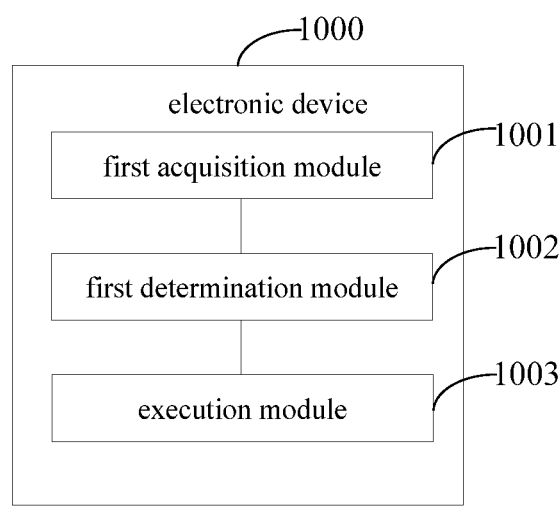
FIG. 10 is a schematic view showing an electronic device according to one embodiment of the present disclosure.

The present disclosure further provides in some embodiments an electronic device for implementing the above-mentioned gesture identification method with a same technical effect. As shown in FIG. 10, the electronic device 1000 includes a first acquisition module 1001, a first determination module 1002 and an execution module 1003. The first acquisition module 1001 is connected to the first determination module 1002, and the first determination module 1002 is connected to the execution module 1003. The first acquisition module 1001 is configured to process a 2D image of a plurality of 2D images including a pointing object and acquire an imaging size of the pointing object in each 2D image. The first determination module 1002 is configured to determine at least one target 2D image from the plurality of 2D images based on the imaging size of the pointing object in the 2D image. The execution module 1003 is configured to determine and execute a corresponding instruction based on the at least one target 2D image.

Figure 11:
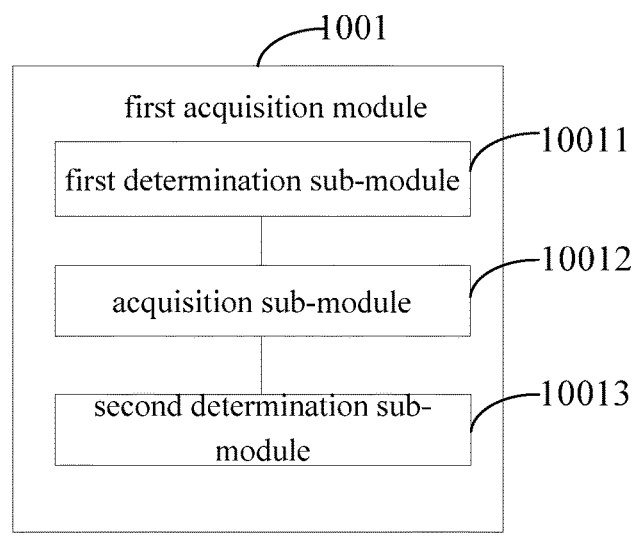
FIG. 11 is a schematic view showing a first acquisition module of the electronic device according to one embodiment of the present disclosure.

In a possible embodiment of the present disclosure, as shown in FIG. 11, the pointing object may include a finger. The first acquisition module 1001 may further include a first determination sub-module 10011, an acquisition sub-module 10012 and a second determination sub-module 10013. The first determination sub-module 10011 is configured to determine a connected region corresponding to the finger included in the 2D image. The acquisition sub-module 10012 is configured to position a fingertip of the finger based on a geometrical feature of the finger, so as to acquire coordinates of the fingertip. The second determination sub-module 10013 is configured to determine a width of the connected region corresponding to coordinates of the fingertip.

In a possible embodiment of the present disclosure, the imaging size of the pointing object in the target 2D image is within a first predetermined size range.

In a possible embodiment of the present disclosure, the first predetermined size range may be one of at least two predetermined size ranges, and any two of the at least two predetermined size ranges may be in interval distribution.

In a possible embodiment of the present disclosure, the plurality of 2D images may further include at least one 2D image corresponding to a second predetermined size range of the at least two predetermined size ranges. The execution module 1003 is further configured to determine and execute the corresponding instruction based on at least one target 2D image corresponding to the first predetermined size range.

In a possible embodiment of the present disclosure, for the at least two predetermined size ranges, a predetermined size range that has a larger imaging size has a larger range length.

Figure 12:
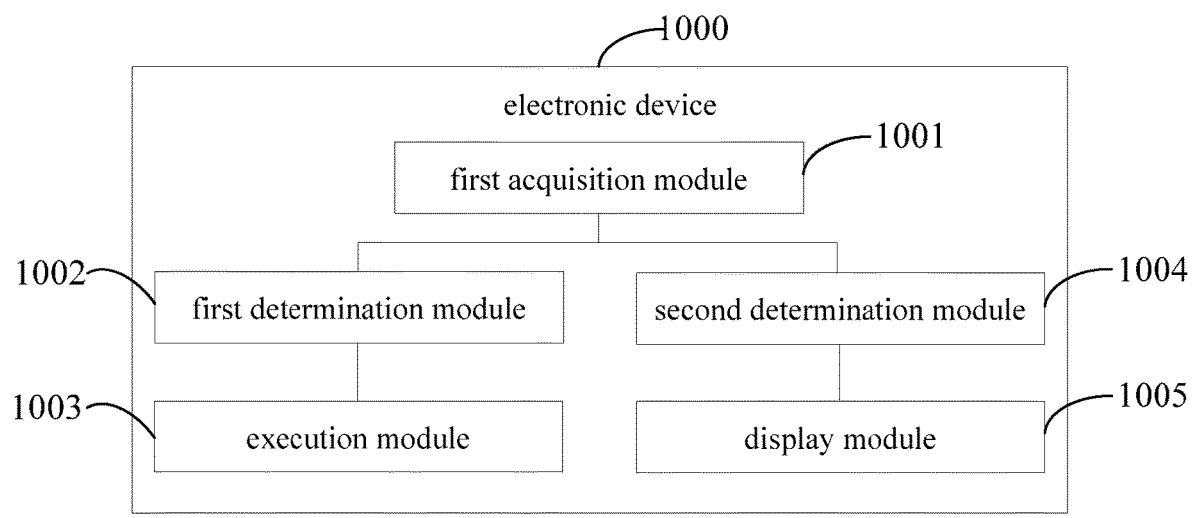
FIG. 12 is another schematic view showing the electronic device according to one embodiment of the present disclosure.

In a possible embodiment of the present disclosure, as shown in FIG. 12, the electronic device 1000 may further include a second determination module 1004 and a display module 1005. The second determination module 1004 is configured to determine a target controllable object set corresponding to the first predetermined size range based on a mapping relationship between predetermined size ranges and a controllable object sets. The display module 1005 is configured to display each controllable object in the target controllable object set.

In a possible embodiment of the present disclosure, the display module 1005 is further configured to, when the target controllable object set is different from a currently-displayed controllable object set, update a current first display interface into a second display interface including the controllable objects in the target controllable object set.

Figure 13:
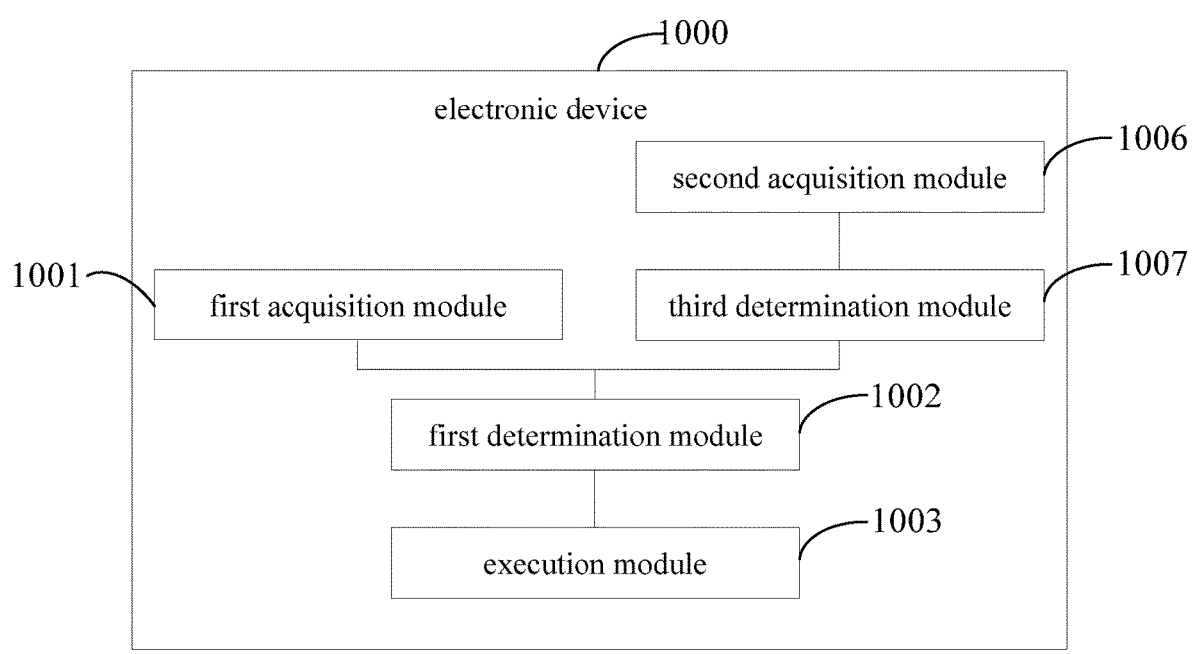
FIG. 13 is yet another schematic view showing the electronic device according to one embodiment of the present disclosure.

In a possible embodiment of the present disclosure, as shown in FIG. 13, the electronic device 1000 may further include a second acquisition module 1006 and a third determination module 1007. The second acquisition module 1006 is configured to acquire a reference 2D image. The third determination module 1007 is configured to determine the first predetermined size range based on the reference 2D image.

In a possible embodiment of the present disclosure, the first predetermined size range may be (W−dw, W+dw), W represents the imaging size of the pointing object in the reference 2D image, and dw represents a length threshold of the first predetermined size range.

In a possible embodiment of the present disclosure, the reference 2D image may include a 2D image acquired initially by the electronic device after the electronic device is started currently, or a 2D image acquired by the electronic device after a predetermined time threshold from a previous 2D image acquired by the electronic device.

The electronic device 1000 may be adopted so as to implement the method in FIGS. 5-6, which will not be particularly defined herein.

According to the embodiments of the present disclosure, each 2D image of the plurality of 2D images including the pointing object may be processed, so as to acquire the imaging size of the pointing object in each 2D image. Next, the at least one target 2D image may be determined from the plurality of 2D images based on the imaging size of the pointing object in each 2D image, and the corresponding instruction maybe determined and executed based on the at least one target 2D image. As a result, it is able to select the target 2D images based on the imaging size of the pointing object, and perform the interaction using the target 2D images that meet the requirements, thereby to prevent the occurrence of erroneous operations as possible.

Figure 14:
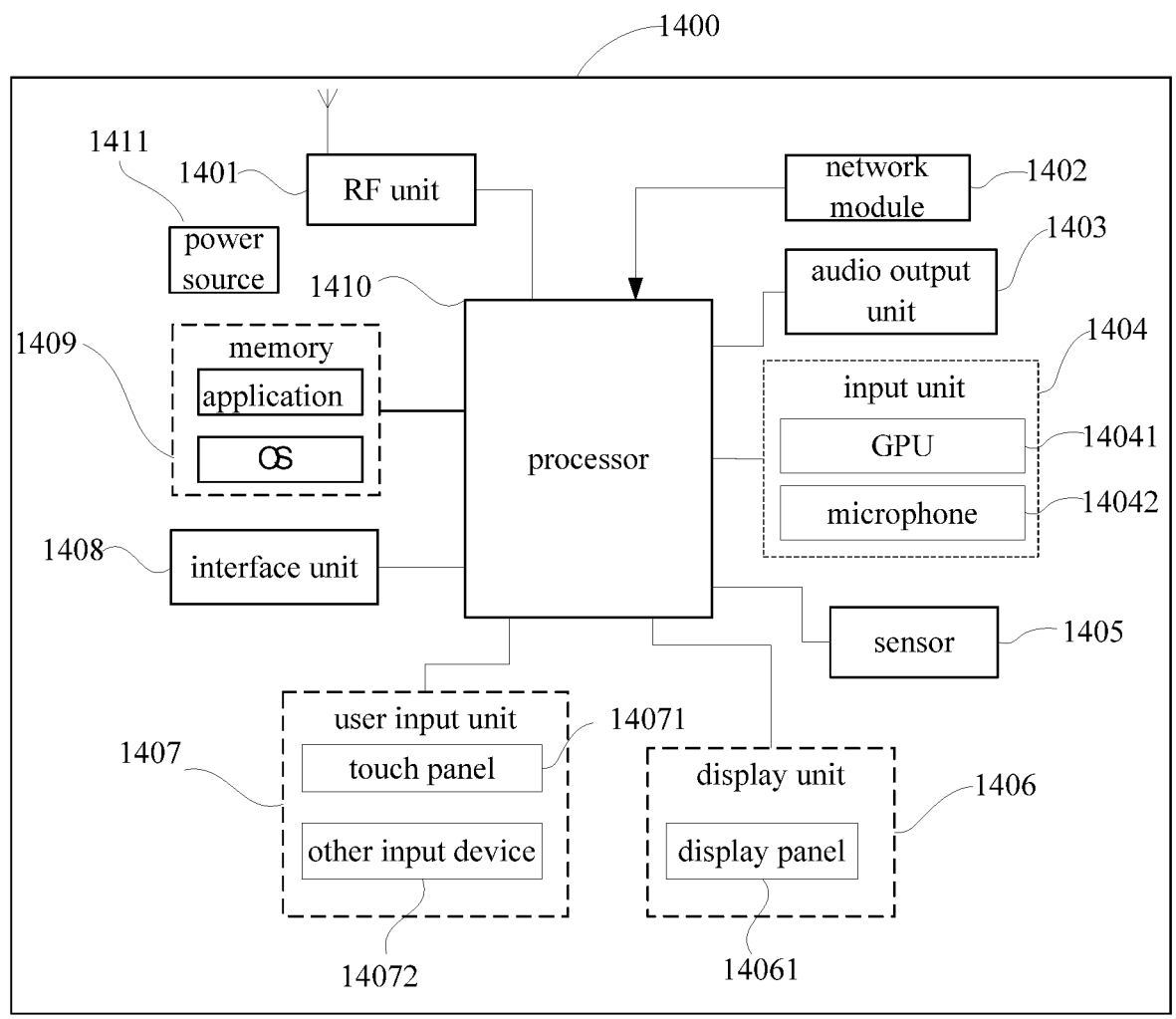
FIG. 14 is a schematic view showing the electronic device according to one embodiment of the present disclosure.

The present disclosure further provides in some embodiments an electronic device 1400 which, as shown in FIG. 14, includes a memory 1409 and a processor 1410. The electronic device may include, but not limited to, mobile phone, tablet computer, laptop computer, PDA, vehicle-mounted terminal, wearable device and pedometer.

The processor 1410 is configured to: process a 2D image of a plurality of 2D images including a pointing object, and acquire an imaging size of the pointing object in the 2D image; determine at least one target 2D image from the plurality of 2D images based on the imaging size of the pointing object in the 2D image; and determine and execute a corresponding instruction based on the at least one target 2D image. As a result, it is able to select the target 2D images based on the imaging size of the pointing object, and perform the interaction using the target 2D images that meet the requirements, thereby to improve the identification accuracy.

In a possible embodiment of the present disclosure, the pointing object may include a finger. The processor 1410 is further configured to: determine a connected region corresponding to the finger included in the 2D image; position a fingertip of the finger based on a geometrical feature of the finger, and acquire coordinates of the fingertip; and determine a width of the connected region corresponding to coordinates of the fingertip.

In a possible embodiment of the present disclosure, the imaging size of the pointing object in the target 2D Image is within a first predetermined size range.

In a possible embodiment of the present disclosure, the first predetermined size range may be one of at least two predetermined size ranges, and any two of the at least two predetermined size ranges may be in interval distribution.

In a possible embodiment of the present disclosure, the plurality of 2D images may further include at least one 2D image corresponding to a second predetermined size range of the at least two predetermined size ranges. The processor 1410 is further configured to determine and execute the corresponding instruction based on at least one target 2D image corresponding to the first predetermined size range.

In a possible embodiment of the present disclosure, for the at least two predetermined size ranges, a predetermined size range that has a larger imaging size has a larger range length.

In a possible embodiment of the present disclosure, the processor 1410 is further configured to: determine a target controllable object set corresponding to the first predetermined size range based on a mapping relationship between predetermined size ranges and a controllable object sets; and display each controllable object in the target controllable object set.

In a possible embodiment of the present disclosure, the processor 1410 is further configured to, when the target controllable object set is different from a currently-displayed controllable object set, update a current first display interface into a second display interface including the controllable objects in the target controllable object set.

In a possible embodiment of the present disclosure, the processor 1410 is further configured to: acquire a reference 2D image; and determine the first predetermined size range based on the reference 2D image.

In a possible embodiment of the present disclosure, the first predetermined size range may be (W−dw, W+dw), W represents the imaging size of the pointing object in the reference 2D image, and dw represents a length threshold of the first predetermined size range.

In a possible embodiment of the present disclosure, the reference 2D image may include a 2D image acquired initially by the electronic device after the electronic device is started currently, or a 2D image acquired by the electronic device after a predetermined time threshold from a previous 2D image acquired by the electronic device.

It should be appreciated that, as shown in FIG. 14, the electronic device may further include one or more of a radio frequency unit 1401, a network module 1402, an audio output unit 1403, an input unit 1404, a sensor 1405, a display unit 1406, a user input unit 1407, an interface unit 1408 and a power source 1411.

It should be further appreciated that, in the embodiments of the present disclosure, the radio frequency unit 1401 is configured to transmit and receive information, or transmit and receive signals during the communication via a phone. To be specific, the radio frequency unit 1401 may, upon the receipt of downlink data from a base station, transmit the downlink data to the processor 1410 for subsequent treatment. In addition, the radio frequency unit 1401 may transmit uplink data to the base station. Usually, the radio frequency unit 1401 may include, but not limited to, an antenna, at least one amplifier, a transceiver, a coupler, a low-noise amplifier and a duplexer. In addition, the radio frequency unit 1401 may communicate with a network and the other devices via a wireless communication system.

The network module 1402 is configured to enable the user to access the broadband Internet in a wireless manner, e.g., help the user to receive and send an e-mail, browse a web or access a streaming media.

The audio output unit 1403 is configured to convert audio data received by the radio frequency unit 1401 or the network module 1402, or audio data stored in the memory

1409, into an audio signal and output the audio signal as a sound. In addition, the audio output unit 1403 is further configured to provide an audio output related to a specific function executed by the electronic device 1400 (e.g., a sound occurring when a calling signal or a message has been received). The audio output unit 1403 may include a loudspeaker, a buzzer and a receiver.

The input unit 1404 is configured to receive an audio or video signal. It may include a Graphics Processing Unit (GPU) 14041 and a microphone 14042. The GPU 14041 is configured to process image data of a static image or video acquired by an image collection unit (e.g., a camera) in a video capturing mode or an image capturing mode, and a processed image frame may be displayed by the display unit 1406. The image frame processed by the GPU 14041 may be stored in the memory 1409 (or any other storage medium) or transmitted via the radio frequency unit 1401 or network module 1402. The microphone 14042 is configured to receive a sound, and convert the sound into voice data. In a call mode, the processed audio data may be converted into data in a format capable of being transmitted by the radio frequency unit 1401 to a mobile communication base station. The electric device 1400 further includes at least one sensor 1405, such as a light sensor, a movement sensor and the other sensors. To be specific, the light sensor may include an ambient light sensor or a proximity sensor. The ambient light sensor is configured to adjust a brightness value of a display panel 14061 based on ambient light. The proximity sensor is configured to turn off the display panel 14061 and/or a backlight source when the electrical device 1400 moves close to ears. As one of the movement sensors, an accelerometer sensor may detect acceleration in various directions (usually a three-axis accelerometer), and detect an amount and a direction of a gravity force when in a static state. Through the accelerometer sensor, it is able to identify a posture of the electronic device (e.g., perform a switching operation between portrait and landscape orientations, play relevant games, and calibrate a posture of a magnetometer), and perform vibration-related identification functions (e.g., count steps and strikes). The sensor 1405 may further include a fingerprint sensor, a pressure sensor, an iris sensor, a molecule sensor, a gyroscope, a barometer, a hygrometer, a thermometer or an infrared sensor, which will not be particularly defined herein.

The display unit 1406 is configured to display information inputted by the user or provided to the user. The display unit 1406 may include the display panel 14061, e.g., a Liquid Crystal Display (LCD) panel, or an Organic Light-Emitting Diode (OLED) panel.

The user input unit 1407 is configured to receive digital or character information inputted by the user, and generate a key signal input related to user settings and function control of the electronic device. To be specific, the user input unit 1407 may include a touch panel 14071 and an input device 14072. The touch panel 14071, also called as touch screen, is configured to collect a touch operation made by the user on or in proximity to the touch panel (e.g., an operation made by the user through any appropriate object or attachment (e.g., finger or stylus) on or in the proximity to the touch panel 14071). The touch panel 14071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1410, and receive and execute a command from the processor 1410. In addition, the touch panel 14071 may be of a resistive type, a capacitive type, an infrared type or a surface acoustic wave (SAW) type. The other input device 14072 may include, but not limited to, a physical keyboard, a functional button (e.g., a volume control button or an on/off button), a trackball, a mouse, and a joystick, which will not be particularly defined herein.

Further, the touch panel 14071 may cover the display panel 14061. When the touch operation made on or in proximity to the touch panel 14071 has been detected, the touch panel 14071 may transmit the touch information to the processor 1410, so as to determine a type of a touch event. Then, the processor 1401 may control the display panel 14061 to provide a corresponding visual output based on the type of the touch event. Although the touch panel 14071 and the display panel 14061 are configured as two separate members in FIG. 14, in some embodiments of the present disclosure, they may be integrated so as to achieve the input and output functions of the electronic device, which will not be particularly defined herein.

The interface unit 1408 is configured to provide an interface between an external device and the electronic device 1400. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1408 is configured to receive an input information from the external device (e.g., data information and electricity) and transmit the input information to one or more elements of the electronic device 1400, or transmit data between the electronic device 1400 and the external device.

The memory 1409 is configured to store therein a software application and various data. It may mainly include an application storage area and a data storage area. An operating system and at least one application for the functions (e.g., an audio/image playing function) may be stored in the application storage area. Data created based on the operation of the mobile phone (e.g., audio data and textbook) may be stored in the data storage area. In addition, the memory 1409 may include a high-speed random access memory (RAM), or a non-volatile memory (e.g., at least one magnetic disk or flash memory), or any other volatile solid state memory. As a control center of the electronic device, the processor 1410 may be connected to the other members of the electronic device via various interfaces and circuits, and configured to run or execute the software program and/or module stored in the memory 1409, and call the data stored in the memory 1409, so as to execute the functions of the electronic device and process the data, thereby to monitor the entire electronic device. The processor 1410 may include one or more processing units. In a possible embodiment of the present disclosure, an application processor and a modem may be integrated into the processor 1410. The application processor is mainly configured to process the operating system, a user interface and the application. The modem is mainly configured to process wireless communication. It should be appreciated that, the modem may also not be integrated into the processor 1410.

The power source 1411 (e.g., a battery) is configured to supply power to the members of the electronic device 1400. In a possible embodiment of the present disclosure, the power source 1411 is logically connected to the processor 1410 via a power source management system, so as to achieve such functions as charging, discharging and power consumption management through the power source management system.

The present disclosure further provides in some embodiments an electronic device, including a processor 1410, a memory 1409, and a computer program stored in the memory 1409 and executed by the processor 1410. The computer program is executed by the processor 1410 so as to implement the above-mentioned gesture identification method with a same technical effect. The details will not be particularly defined herein to avoid repetition.

The present disclosure further provides in some embodiments a computer-readable storage medium storing therein a computer program. The computer program is executed by a processor so as to implement the above-mentioned gesture identification method with a same technical effect. The details will not be particularly defined herein to avoid repetition. The computer-readable storage medium may be a Read-Only Memory (ROM), an RAM, a magnetic disk or an optical disk.

It should be appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by hardware, or preferably by software as well as a necessary common hardware platform. Based on this, the technical solutions of the present disclosure, partial or full, or parts of the technical solutions of the present disclosure contributing to the related art, may appear in the form of software products, which may be stored in a storage medium (e.g., an ROM/RAM, a magnetic disk or an optical disk) and include several instructions so as to enable computer equipment (a personal computer, a server or network equipment) to implement the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A gesture identification method, comprising:
generating a plurality of two-dimensional (2D) images;
processing each of the plurality of 2D images, wherein a pointing object is included in each of the plurality of 2D images;
acquiring an imaging size of the pointing object in each of the plurality of 2D images;
determining at least one target 2D image from the plurality of 2D images based on the imaging size of the pointing object in each of the plurality of 2D images;
determining and executing a corresponding instruction based on the at least one target 2D image;
acquiring a reference 2D image; and
determining the first predetermined size range based on the reference 2D image,
wherein the imaging size of the pointing object in the target 2D image is within a first predetermined size range,
wherein the first predetermined size range is (W−dw, W+dw), W represents the imaging size of the pointing object in the reference 2D image, and dw represents a length threshold of the first predetermined size range.

2. The gesture identification method according to claim 1, wherein the pointing object comprises a finger, and the processing each two-dimensional (2D) image of the plurality of 2D images comprising the pointing object to acquire the imaging size of the pointing object in each 2D image comprises:
determining a connected region corresponding to the finger included in the 2D image;
positioning a fingertip based on a geometrical feature of the finger, and acquiring coordinates of the fingertip; and
determining a width of the connected region corresponding to the fingertip based on the coordinates of the fingertip.

3. The gesture identification method according to claim 1, wherein the first predetermined size range is one of at least two predetermined size ranges, and the at least two predetermined size ranges are in interval distribution.

4. The gesture identification method according to claim 3, wherein the plurality of 2D images further comprise at least one 2D image corresponding to a second predetermined size range of the at least two predetermined size ranges, and
the determining and executing the corresponding instruction based on the at least one target 2D image comprises:
determining and executing the corresponding instruction based on at least one target 2D image corresponding to the first predetermined size range.

5. The gesture identification method according to claim 3, wherein for the at least two predetermined size ranges, a predetermined size range that has a larger imaging size than other predetermined size ranges in the at least two predetermined size ranges has a larger range length than the other predetermined size ranges in the at least two predetermined size ranges.

6. The gesture identification method according to claim 3, further comprising:
determining a target controllable object set corresponding to the first predetermined size range based on a mapping relationship between predetermined size ranges and controllable object sets; and
displaying controllable objects in the target controllable object set.

7. The gesture identification method according to claim 6, wherein the displaying controllable objects in the target controllable object set comprises:
when the target controllable object set is different from a currently-displayed controllable object set, updating a current first display interface into a second display interface comprising the controllable objects in the target controllable object set.

8. The gesture identification method according to claim 1, wherein the reference 2D image comprises a 2D image acquired initially by an electronic device after the electronic device is started, or a 2D image acquired by the electronic device at a time having a time interval more than a predetermined time threshold from a time at which a previous 2D image is acquired by the electronic device.

9. An electronic device, comprising
a processor and a memory, the processor is configured to implement:
generating a plurality of two-dimensional (2D) images;
processing each of the plurality of 2D images, wherein a pointing object is included in each of the plurality of 2D images;
acquiring an imaging size of the pointing object in each of the plurality of 2D images;
determining at least one target 2D image from the plurality of 2D images based on the imaging size of the pointing object in each of the plurality of 2D images;
determining and executing a corresponding instruction based on the at least one target 2D image;
acquiring a reference 2D image; and
determining the first predetermined size range based on the reference 2D image,
wherein the imaging size of the pointing object in the target 2D image is within a first predetermined size range,
wherein the first predetermined size range is (W−dw, W+dw), W represents the imaging size of the pointing object in the reference 2D image, and dw represents a length threshold of the first predetermined size range.

10. The electronic device according to claim 9, wherein the first predetermined size range is one of at least two predetermined size ranges, and the at least two predetermined size ranges are in interval distribution.

11. The electronic device according to claim 10, wherein the plurality of 2D images further comprise at least one 2D image corresponding to a second predetermined size range of the at least two predetermined size ranges, and the processor is further configured to determine and execute the corresponding instruction based on at least one target 2D image corresponding to the first predetermined size range.

12. The electronic device according to claim 10, wherein for the at least two predetermined size ranges, a predetermined size range that has a larger imaging size than other predetermined size ranges in the at least two predetermined size ranges has a larger range length than the other predetermined size ranges in the at least two predetermined size ranges.

13. The electronic device according to claim 10, wherein the processor is further configured to:
determine a target controllable object set corresponding to the first predetermined size range based on a mapping relationship between predetermined size ranges and controllable object sets; and
a display is configured to display controllable objects in the target controllable object set.

14. The electronic device according to claim 13, wherein the display is configured to, when the target controllable object set is different from a currently-displayed controllable object set, update a current first display interface into a second display interface comprising the controllable objects in the target controllable object set.

* * * * *